Inventor
Ronald H. Chapman
By
Mueller & Aichele
Attys.

Inventor
Ronald H. Chapman
By
Mueller & Aichele
Attys.

United States Patent Office 3,414,881

Patented Dec. 3, 1968

3,414,881

DECODER FOR DIGITAL PULSE CODE INCLUDING TRANSISTORIZED COUNTERS

Ronald H. Chapman, Wheaton, Ill., assignor to Motorola, Inc., Franklin Park, Ill., a corporation of Illinois Filed Jan. 15, 1965, Ser. No. 425,699
5 Claims. (Cl. 340—164)

ABSTRACT OF THE DISCLOSURE

Decoder for responding to digital pulse code including plurality of groups of pulses with transistorized pulse counter having stages selectively connected to coupling circuits of the stages of a transistorized digit counter. An interdigit timer applies a pulse at the end of each pulse group to the pulse counter to reset the same and to the digit counter to cause the same to step from one stage to the next. The digit counter can step to the next stage only when the coupling circuit thereof is enabled by a voltage applied thereto from the connected stage of the pulse counter.

This invention relates to digital selecting systems, and more particularly to a transistorized system for decoding a multiple digit calling code.

Digital signal codes have found application in many systems. For example, digital pulse codes are used in telephone systems to identify particular stations. In mobile radio telephone systems, space is at a premium and there is a requirement for a compact digital decoder which provides an indication at a mobile station when the calling code associated with the station is received. A system for decoding a calling code is described and claimed in United States Patent No. 3,080,547 assigned to Motorola, Inc., assignee of the present invention. This application is directed to a different system which has advantages in particular applications.

It is an object of the present invention to provide an improved transistorized digital decoder.

Another object of the invention is to provide a transistorized multiple digit selective system for use in a mobile station of a radio telephone system which can be easily set up to respond to a particular calling code signal.

Another object of the invention is to provide a digital decoder which is completely transistorized, and which is arranged so that the minimum number of stages is conducting at any one time, to thereby conserve power.

A feature of the invention is the provision of a pulse decoding system for selecting a multiple digit code signal, and including a first counter for responding to the pulses of each digit, and a second counter having stages associated with the digits and selectively connected to the stages of the first counter to set up the code call to which the system responds.

Another feature of the invention is the provision of a digital selective system including a transistorized pulse counter for counting the pulses of each digit and a transistorized digit counter selectively coupled to the stages of the pulse counter to indicate when the number of pulses of each digit corresponds to a preset code, with control means to reset the pulse counter at the end of each digit and to cause the digit counter to be stepped from one stage to another at the end of the pulse group for each correct digit. Only the transistors of the stages of the pulse and digit counters which are active at any particular time are energized to thereby conserve power.

A further feature of the invention is the provision of a digital selective system including a pulse counter and a digit counter, wherein the stages of the digit counter are connected to stages of the pulse counter corresponding to the digits of the code number to be selected, and wherein each pulse counter stage provides a voltage to enable the digit counter stage connected thereto so that the digit counter steps from one stage to the next in response to pulses applied at the end of each group of pulses which corresponds to a digit of the code number.

The invention is illustrated in the drawings wherein.

The system of the invention operates with a train of pulses, such as pulses used in dial telephone operations, which form a code number. The pulses are provided in groups corresponding to the digits of the code number, with the groups being separated by a time interval greater than the time interval between the pulses of a group. The pulse train is applied to a pulse counter, with each pulse causing the counter to step from one stage to the next, and each pulse group energizing the stage of the counter corresponding to the number of the digit represented thereby. The pulses are also applied to an inter-digit timer which produces a pulse at the end of each pulse group and applies the same to the pulse and digit counters. The digit counter has a number of stages corresponding to the number of digits in the code number, and each stage is coupled to one stage of the pulse counter. Energization of a stage in the pulse counter enables the connected stage of the digit counter so that the digit counter will step from this stage to the next in response to a pulse from the inter-digit timer. The pulse applied to the pulse counter by the inter-digit timer at the end of each pulse group resets the pulse counter so that it responds properly to the next pulse group. In the event that there is a mismatch at any digit, transfer between digit counter stages does not take place and the system resets. When all of the pulse groups match with the setting of the digit counter stages, a control is energized to indicate that the code number set-up is received. This may operate a ringer, for example.

Figure 1:
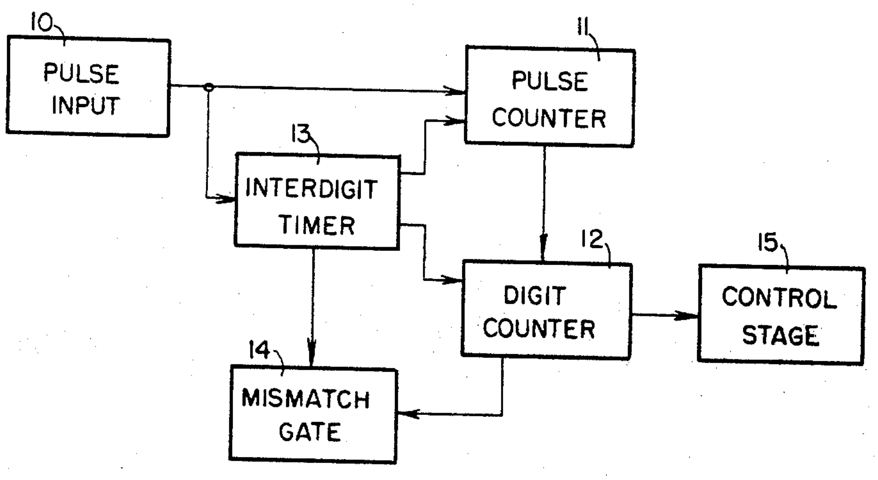
FIG. 1 is a block diagram of the selective system of the invention.

FIG. 1 is a block diagram showing the main components of the system of the invention, and the interconnections thereof. The pulse input 10 may be a circuit for receiving bursts of tones as transmitted over a radio system and converting the same into direct current pulses. The pulses from the input 10 are applied to pulse counter 11 and to inter-digit timer 13. The pulse counter has ten outputs corresponding to the ten possible numbers of each digit. The inter-digit timer responds to the pulses and when an interval greater than the interval between successive pulses of a group is received, a pulse is produced and applied to the pulse counter to reset the same. A pulse is also applied to the digit counter 12 to actuate the same.

The digit counter 12 includes a number of stages corresponding to the number of digits in the code number to be used. Each stage of the digit counter is connected to the stage of the pulse counter which corresponds to the number of the digit represented by the particular stage of the digit counter. The digit counter will step from one stage to the next in response to pulses from the inter-digit timer, provided the stages of the pulse counter to which the digit counter stages are connected, are then energized. This action is provided by a coupling circuit in each digit counter stage which prevents the stage from being actuated until a voltage is received from the pulse counter stage to which it is connected.

As an example, assume that the first digit of the code number is three, the first stage of the digit counter will then be connected to the third stage of the pulse counter. This pulse counter will be activated in response to three pulses to energize the coupling circuit of the first stage of the digit counter, so that this stage will be actuated when the inter-digit timer generates a pulse. If there is a mismatch, the coupling circuit will not activate the next stage and all of the digit stages are deenergized and the digit counter is reset. This also actuates mismatch gate 14. When a match occurs in all stages of the digit counter, the counter 12 actuates a control stage 15 to operate a ringing device or the like, to indicate that the code number which is set up has been received.

Figure 2:
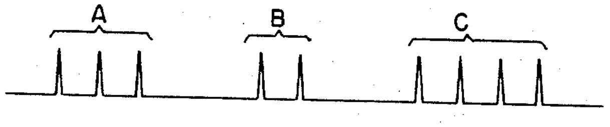
FIG. 2 illustrates the pulses of a code number as used in the system.
Figure 3:
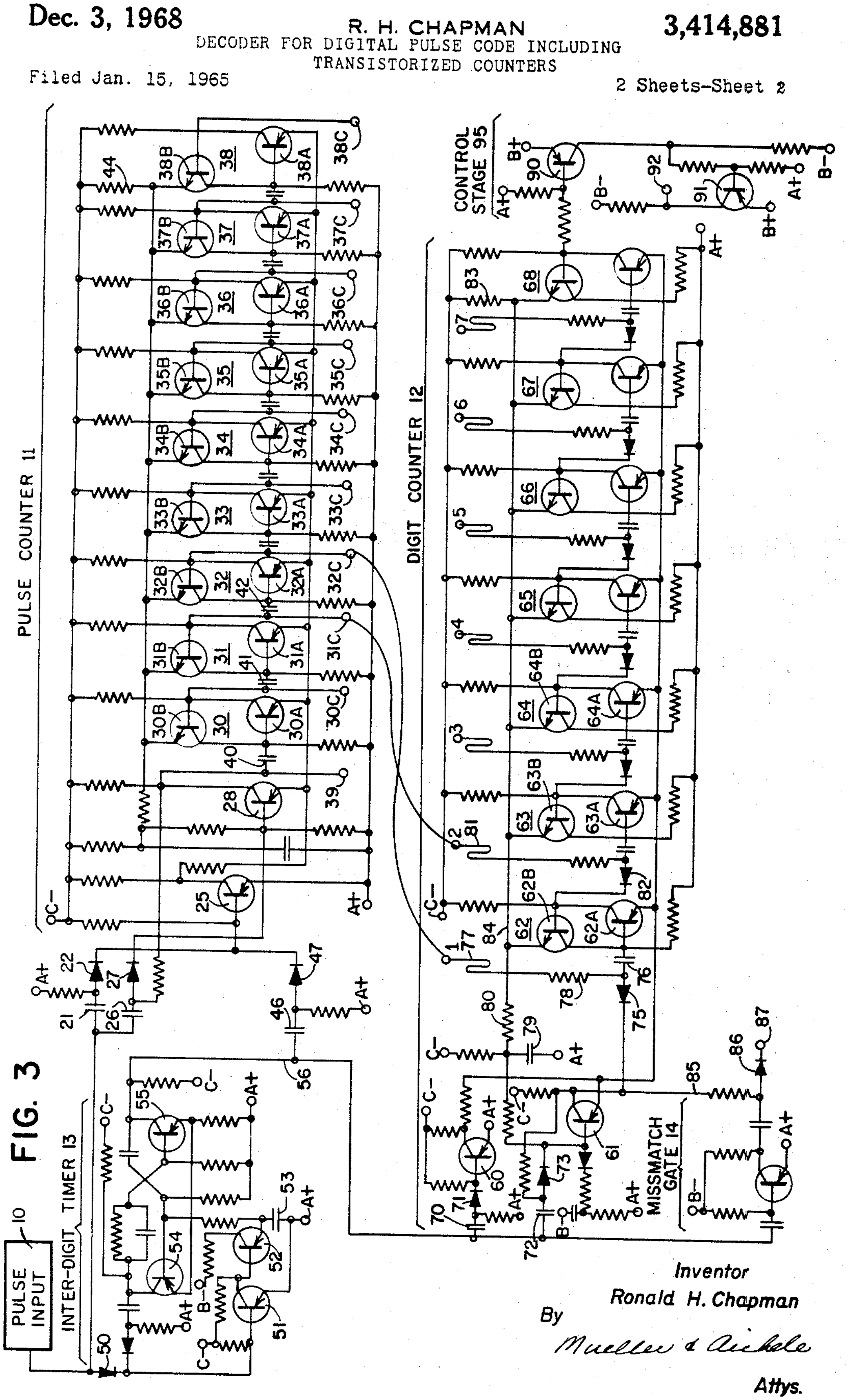
FIG. 3 is a circuit diagram of the decoding system of the invention.

The circuit diagram for the digital decoding system for responding to the telephone type pulse codes, and for producing such a code, is shown in FIG. 3. The pulse input circuit 10 may include circuits responsive to pulses of tones of various frequencies to provide a direct current pulse train corresponding to the digits of a code call. This is represented in FIG. 2 wherein the first group A of three pulses represents the first digit "3," the second group B of signal pulses represents the second digit "2," and the third group C of four pulses represents the third digit "4." The circuit of FIG. 3 includes provisions for code numbers having seven digits. It will be apparent that the interval between the pulses of the groups forming the digits is substantially greater than the interval between the pulses of a single digit group.

The pulses from input circuit 10 are applied through capacitor 21 and rectifier 22 to the base electrode of transistor 25 which forms the drive amplifier of the pulse counter 11. The input pulses are also applied through capacitor 26 and diode 27 to the base electrode of transistor 28 of the pulse counter 11. Transistor 28 is connected in a reset circuit. Transistors 25 and 28 are each cut off by an input pulse, but the coupling circuits are selected to provide time constants such that transistor 28 is cut off for a longer time than transistor 25.

The pulse counter has nine pulse counting stages designated 30 to 38 respectively. Each stage has a pair of transistors connected to a regenerative circuit, and designated by numerals designating the stage, with the letters A and B being used to indicate the individual transistors. When the transistors 25 and 28 are cut off, a negative voltage is applied from the collector of transistor 25 to the emitter of transistor 30A of the first stage 30, and to the A transistor of each of the other counter stages. This holds all the A transistors cut off. Cut off of transistor 28 provides a negative pulse from the collector thereof through capacitor 40 to the base of transistor 30A. This tends to turn on the transistor 30A but because of the negative potential at its emitter it cannot turn on until transistor 25 becomes conducting to remove the negative potential at the emitter of transistor 30A. As previously stated, transistor 28 will be cut off for a longer period than transistor 25 in response to each received pulse, so that the pulse applied to the base of transistor 30A to turn on this transistor continues after the negative potential at its emitter is removed. This renders the collector of transistor 30A positive to turn on transistor 30B, and the collector of transistor 30B is coupled to the base of transistor 30A to render transistor 30A more conducting. This regenerative action causes the transistors 30A and 30B to become fully conducting very rapidly.

When transistors 30A and 30B are conducting, the positive potential at the collector of transistor 30A and at the base of transistor 30B is applied to terminal 30C. Terminal 30C as well as the corresponding terminals of the other pulse counter stages are selectively connected to the stages of the digit counter as will be explained. All of the B transistors are connected through a common resistor 44, which applies drive potential to the base of reset transistor 28. When transistor 30B, or any of the B transistors conducts, the drive is removed from transistor 28 so that the reset action is disabled.

When the next pulse is received, transistor 25 is again cut off. The negative pulse applied from the collector of transistor 25 to the emitter of transistor 30A cuts off the transistor 30A so that a negative pulse is coupled through capacitor 41 to the base of transistor 31A of the next counter stage. This causes the transistor 31B to be conducting through the regenerative connection which has been described previously. The third received pulse cuts off transistor 25 again to cut off the stage 31 so that a pulse is applied through capacitor 42 to the transistor 32A of the third counter stage. This stage is rendered rapidly conducting by action of transistors 32A and 32B as previously described. It will be apparent that the remaining stages 33, 34, 35, 36, 37 and 38 will be actuated when pulses up to 9 are applied. When ten pulses are received there is no further stage to be actuated and all of the regenerative stages are off. Resistor 44 therefore applies a drive voltage to the base of transistor 28 so that this transistor conducts and provides a positive potential at terminal 39 which forms the "0" terminal of the counter.

The pulses from the pulse input 10 are also applied through the diode 50 to the inter-digit timer 13. The inter-digit timer includes a first transistor 51 which serves as a pulse amplifier, a second transistor 52 which drives an integrator, and transistors 54 and 55 which are connected in a Schmitt trigger circuit. The inter-digit timer becomes activated by a positive pulse from the pulse input 10. Input pulses applied through diode 50 to the base of transistor 51 cut off this transistor so that a negative pulse is produced at the collector and applied to the base of transistor 52. This causes the emitter of transistor 52 to go negative to charge capacitor 53 to turn on the Schmitt trigger circuit. As long as pulses are received, capacitor 53 remains charged and the Schmitt trigger circuit is held in operative condition. When pulses are interrupted between digits, transistor 51 is rendered conducting and transistor 52 is cut off. This permits capacitor 53 to slowly discharge. The values are selected so that after a time interval of 190 milliseconds the charge on capacitor 53 is reduced to a level to turn off the Schmitt trigger circuit. A positive pulse is then developed at the collector of transistor 55 and applied through conductor 56 to pulse counter 11, digit counter 12 and mismatch gate 14.

The pulse on conductor 56 at the end of each digit is applied through capacitor 46 and diode 47 to the base of transistor 25 of the pulse counter. As previously stated, this cuts off transistor 25 so that a negative voltage is applied from its collector to the emitter electrode of transistor 28 and all the A transistors of the pulse counter stages. This acts to reset the pulse counter so that it is ready to receive pulses for the next digit.

The digit counter includes transistor 60 which functions as a drive amplifier, transistor 61 in the reset stage and stages 62, 63, 64, 65, 66, 67 and 68. As previously stated, the seven stages of the digit counter are for determining a match of the seven digits of a code signal. The stages 62 to 68 inclusive are generally similar to the stages 30 to 38 of the pulse counter. The output of the inter-digit timer on conductor 56 is applied through capacitor 70 and diode 71 to the base electrode of drive transistor 60, and through capacitor 72 and diode 73 to the base electrode of reset transistor 61. The signal applied to the drive transistor cuts off this transistor so that a negative signal is developed at the collector, and is coupled to the emitter electrodes of transistor 61, and to the emitter electrodes of all the A transistors of counter stages 62 to 68 inclusive. This pulse also cuts off transistor 61 to provide a negative pulse at its collector which is connected through diode 75 and capacitor 76 to the transistor 62A of the first counter stage. However, diode 75 is normally non-conducting to prevent application of this pulse to the first counter stage.

Each counter stage has a conductor selectively connected to one of the outputs 30C to 38C and 39 of the pulse counter. As previously stated, these outputs correspond to the number of pulses applied to the pulse counter. Stage 62 of the digit counter represents the first digit, and is shown connected to the third stage of the pulse counter to respond to a code having three as the first digit. As previously stated when three pulses are applied to the pulse counter, the stage 32 will be activated so that the potential at the collector of transistor 32A is positive. The collector of transistor 32A is connected to terminal 32C, which is connected to conductor 77 of stage 62 of the digit counter. The positive potential at terminal 32C is applied through resistor 78 to diode 75, enabling this diode to conduct. Accordingly, the negative potential from the collector of reset transistor 61 is applied through diode 75 and capacitor 76 to the base of transistor 62A. Transistor 62A, however, remains cut off since its emitter is biased negative by the signal from the collector of drive transistor 60.

When the pulse applied to the base of transistor 60 from the inter-digit timer 13 terminates, the negative potential from the collector of transistor 60 is removed. This will allow transistor 62A to conduct, and will cause transistor 62B to conduct, so that the stage 62 is activated. Transistors 62A and 62B are connected in a regenerative circuit as previously described in connection with transistors 30A and 30B of the pulse counter 11. After stage 62 is rendered conducting, the pulse applied from the inter-digit timer to the base electrode of transistor 61 holds the transistor 61 turned off. During this time capacitor 79 discharges through resistor 80 and transistor 62B to remove the drive from the base of transistor 61, and the positive potential on line 84 continues to hold transistor 61 cut off as long as any stage of the digit counter 12 is conducting. This disables the reset action.

After the second digit of the code signal is received, the inter-digit timer 13 again applies a pulse on conductor 56 to drive transistor 60. The second stage 62 of the digit counter is connected to the second stage 31 of the pulse counter to respond to a code number in which the second digit is "2." In the event that a code match occurs from the second pulse group, a positive potential is applied from the terminal 31C of the second stage of the pulse counter to conductor 81 to render diode 82 conducting. This applies the negative pulse from stage 62 through diode 82 to the A transistor of the digit counter stage 63.

In the event that the number of pulses received for the second digit differ from the code, a mismatch condition exists. In such case the diode 82 is reversed biased so that the negative pulse prevents the second stage from being turned on. Capacitor 79 then charges negative through resistors 80 and 83 and turns on transistor 61. With transistor 61 conducting, all of the other digit counter stages are biased off. This resets the digit counter, and the pulse counter has been reset by the pulse from the inter-digit timer 13, so that the selector is ready for a new selecting operation.

In the event that a code match is obtained for all of the digits of a code number, the stages 62 to 68 of digit counter 12 will be rendered conducting in turn. Conduction of the last stage 68 applies a positive signal to the base of control transistor 90 so that this transistor is turned off. This provides a negative voltage at the collector of transistor 90. This voltage is applied to the base of a second control transistor 91 to turn on the transistor 91 so that a positive potential appears at the terminal 92 connected to the collector of transistor 91. These potentials may be used to actuate various equipment such as the ringer in a telephone system which indicates that the proper code signal has been received.

When a mismatch occurs, and the inter-digit timer relaxes after completion of a pulse group, the voltage applied from the inter-digit timer 13 to the mismatch gate 14 on line 56 causes an output from the mismatch gate which may be utilized to provide operation of any desired equipment. Action of the mismatch gate 14 in response to the voltage from the inter-digit timer 13 is inhibited when a match condition exists, by the potential applied from conductor 85 connected to the reset transistor 61. This is a negative signal which is applied to diode 86 to reverse bias the same. However, when a mismatch condition exists, the negative potential is removed from conductor 85 by conduction of transistor 61, so that the diode 86 conducts and transfers the voltage from the inter-digit timer to the output terminal 87.

The system of the invention has been found to provide highly satisfactory operation as a decoder. The pulse counter and digit counter circuits include stages having transistors which are normally non-conducting, with only the transistors of the one stage which is activated being conducting. This results in minimum current drain and is to be contrasted to counter stages including two transistors, one of which is always conducting.

Although the system is described with nine pulse counter stages and seven digit counter stages so that code numbers having seven digits can be used, and any number can be used for any digit, a system may be provided in accordance with the invention wherein different numbers of stages are provided in the pulse and digit counters. The number of stages in the pulse and/or the digit counters can be reduced in a system which requires only a small number of different codes. The maximum number of different codes can be provided by use of the least number of stages when the pulse counter has the same number of stages as the digit counter.

The system is arranged so that the code number can be easily set up, with it being necessary to establish only one connection for each digit of the code number to be used. Any selector can be set to any code number so long as the digit counter has as many stages as there are digits in the code number. If a code number is to be used with fewer digits than the number of stages in the digit counter, it is merely necessary to connect the last stage used to the control transistor 90.

1. A digital decoder for responding to a code number represented by a plurality of pulse groups applied in sequence and corresponding to the digits of the code number, said decoder including in combination, a multistage pulse counter, means for applying the pulse groups representing the digits of the code number to said pulse counter, said stages of said counter being energized in turn by the pulses of each group, means for resetting said pulse counter after each group of pulses, and a digit counter having a number of stages corresponding to the number of digits in the code number, each of said stages of said digit counter including selectively operated coupling means responsive to a voltage to enable the same, said coupling means of each of said stages of said digit counter being connected to one stage of said pulse counter, each of said pulse counter stages when energized applying a voltage to said coupling means of said digit counter stage connected thereto to enable the same and means for applying a pulse to said digit counter after each pulse group to cause operation of the next stage thereof in response to the enabling of said coupling means of such stage, so that the stages of said digit counter are operated in turn in response to pulse groups representing the digits of a predetermined code number.

2. A digital decoder in accordance with claim 1 wherein each stage of said pulse counter and of said digit counter includes a pair of transistors connected in a regenerative circuit, and including means whereby the transistors of only one stage of each counter is conducting at any time.

3. A digital decoder in accordance with claim 1 including timer means for producing a pulse after each group of pulses coupled to said means for resetting said pulse counter and to means for applying a pulse to said digit counter.

4. A digital decoder in accordance with claim 3 including a mismatch gate connected to said timer means and to said digit counter, and means for applying an inhibit signal from said digit counter to said mismatch gate in response to pulses corresponding to the predetermined code number, with said mismatch gate transferring the pulse from said timer in the absence of such inhibit signal.

5. A digital decoder in accordance with claim 1 including control means coupled to said last stage of said digit counter, and wherein said digit counter actuates said control means in response to the receipt of successive pulse groups representing the digits of said predetermined code number.

References Cited

UNITED STATES PATENTS

| | | | |
|---|---|---|---|
| 2,563,127 | 8/1951 | McGoffin. | |
| 2,648,831 | 8/1953 | Vroom | 340—164 |
| 3,064,236 | 11/1962 | Coleman | 340—164 |
| 3,080,547 | 3/1963 | Cooper. | |
| 3,171,098 | 2/1965 | Gabrielson. | |
| 3,201,756 | 8/1965 | Young | 340—164 |
| 3,327,290 | 6/1967 | English | 340—164 |

JOHN W. CALDWELL, *Primary Examiner.*

DONALD J. YUSKO, *Assistant Examiner.*